Figure 3:
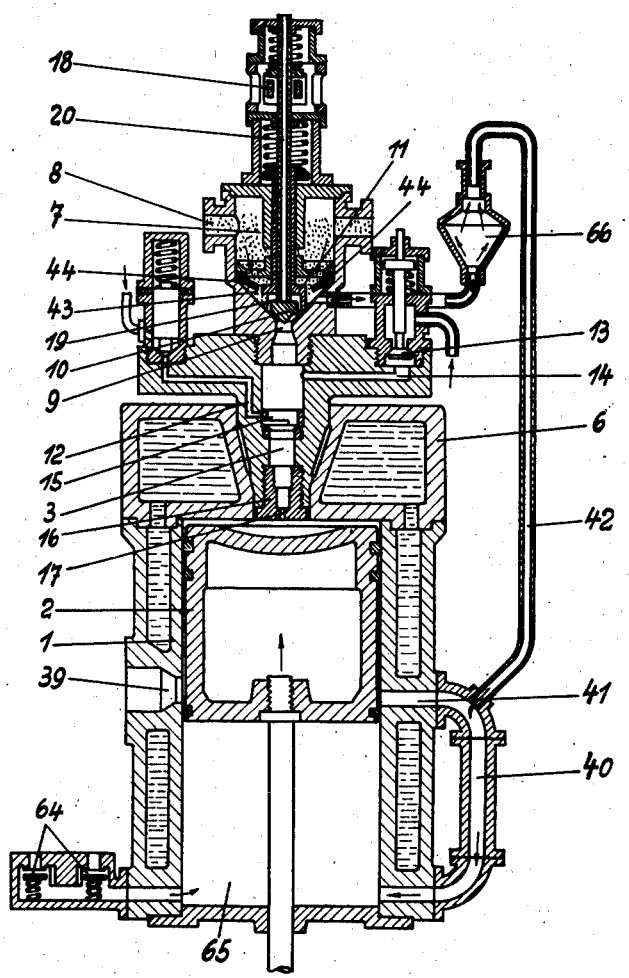

July 2, 1929. R. PAWLIKOWSKI 1,719,023
DEVICE FOR WORKING COMBUSTION ENGINES WITH LIQUID OR PULVERIZED FUELS
Filed Aug. 20, 1927 9 Sheets-Sheet 1
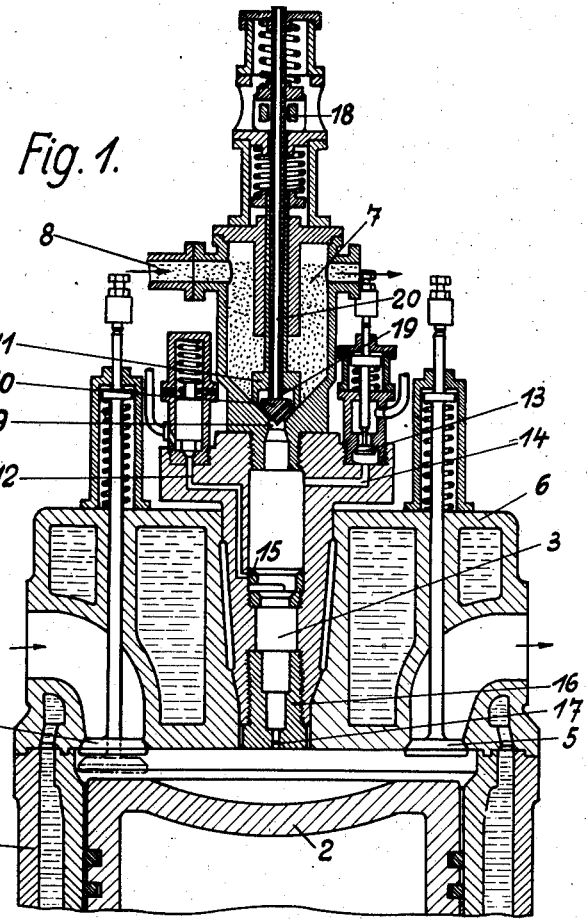
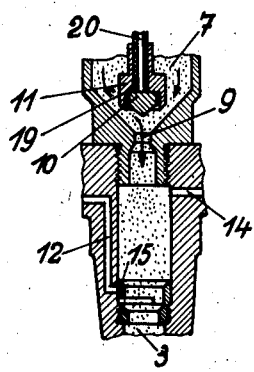

July 2, 1929.  R. PAWLIKOWSKI  1,719,023
DEVICE FOR WORKING COMBUSTION ENGINES WITH LIQUID OR PULVERIZED FUELS
Filed Aug. 20, 1927    9 Sheets-Sheet 2

Inventor:
Rudolf Pawlikowski

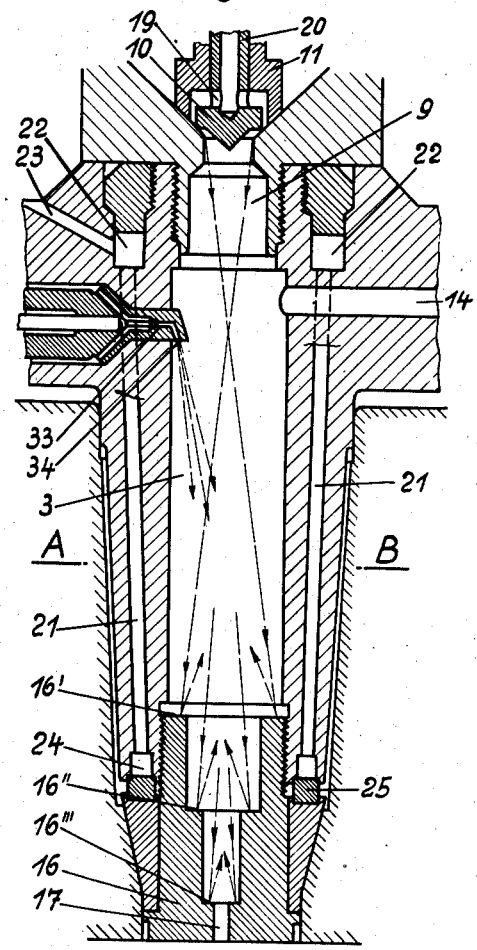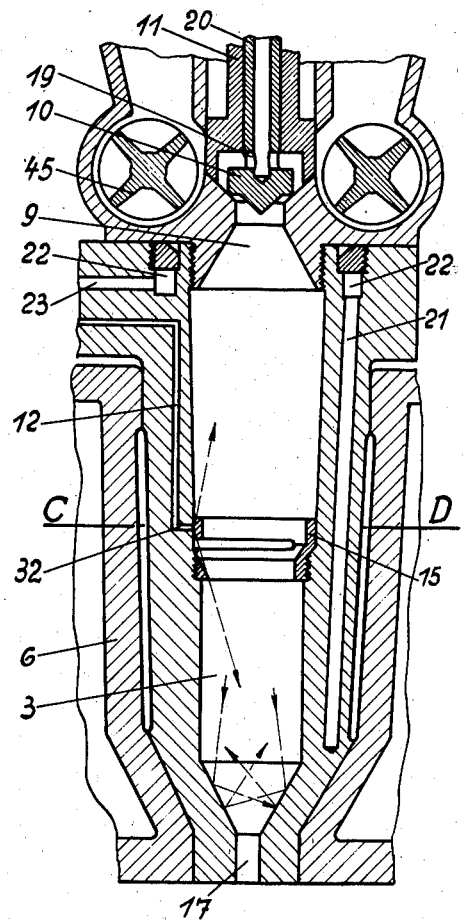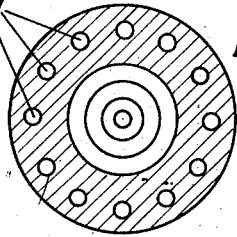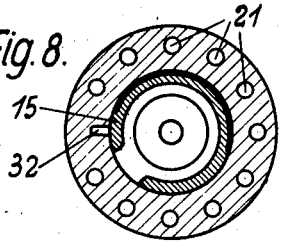

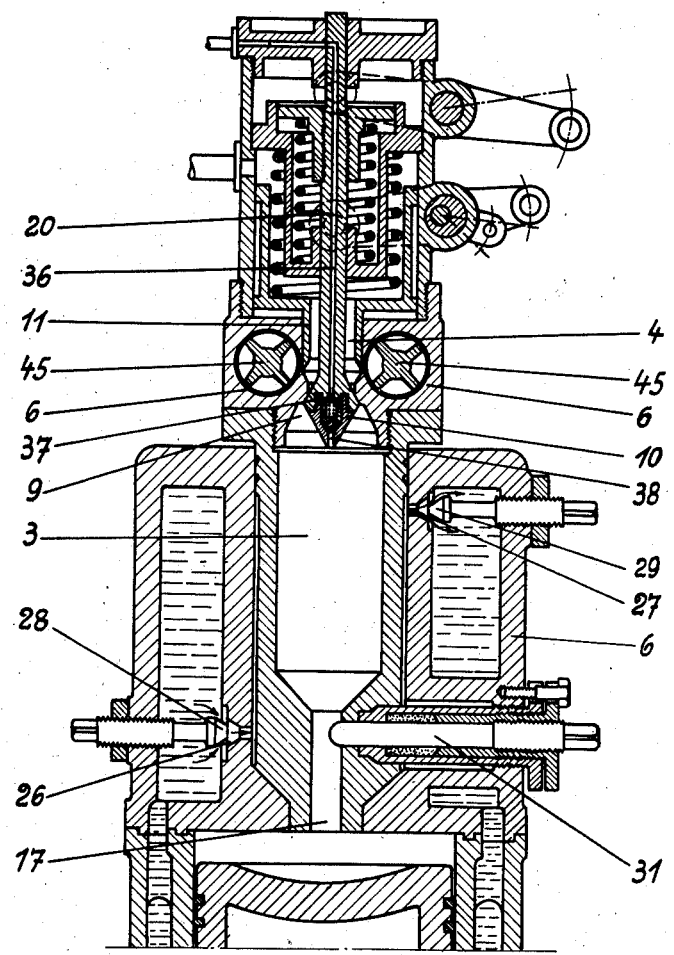

July 2, 1929.  R. PAWLIKOWSKI  1,719,023
DEVICE FOR WORKING COMBUSTION ENGINES WITH LIQUID OR PULVERIZED FUELS
Filed Aug. 20, 1927    9 Sheets-Sheet 7

Inventor.
Rudolf Pawlikowski

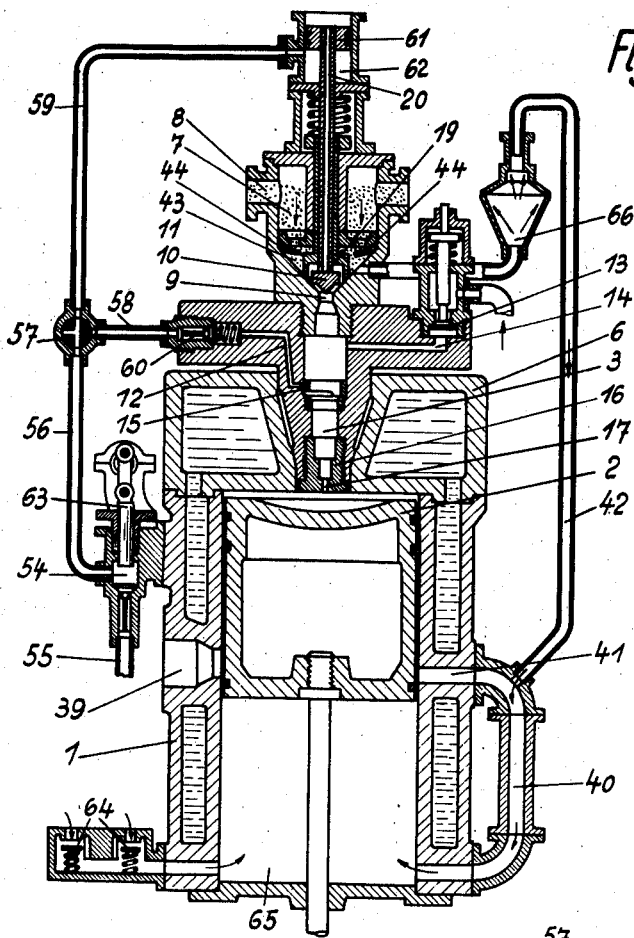
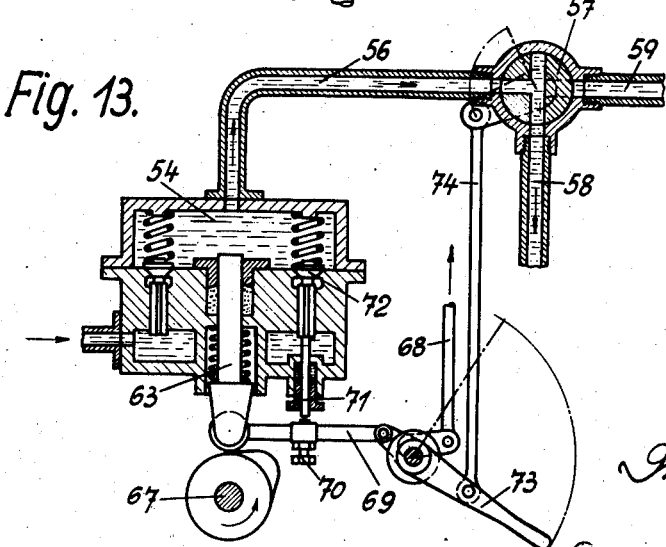

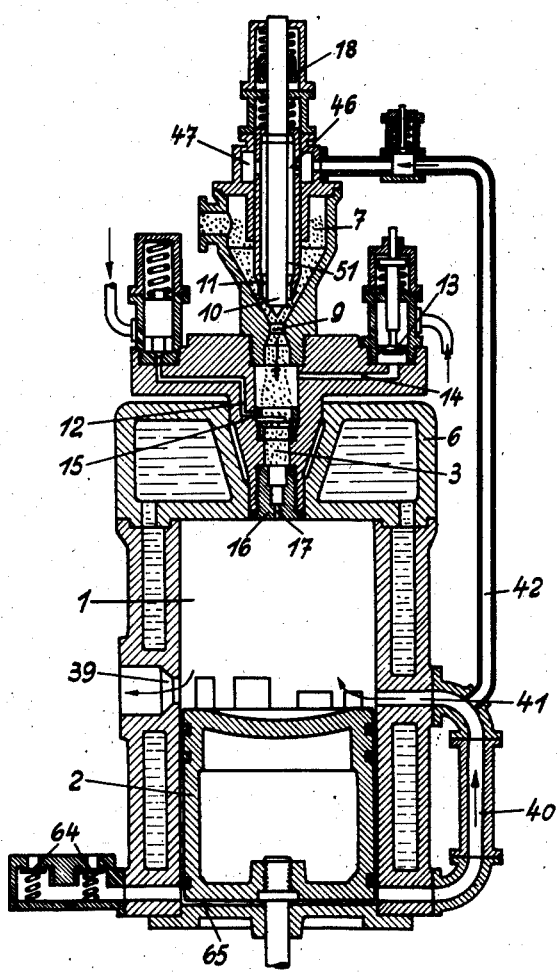

Patented July 2, 1929.

1,719,023

UNITED STATES PATENT OFFICE.

RUDOLF PAWLIKOWSKI, OF GOERLITZ, GERMANY.

DEVICE FOR WORKING COMBUSTION ENGINES WITH LIQUID OR PULVERIZED FUELS.

Application filed August 20, 1927, Serial No. 214,436, and in Germany September 4, 1926.

Heretofore there have been, amongst others, two principal types of reciprocating internal combustion engines, namely, those operating according to the Otto cycle and those working on the principle of the Diesel engine. In the first named class of engines a mixture of air and fuel is sucked into the working cylinder at the suction stroke and compressed therein as a finished mixture during the compression stroke. The Diesel motor compresses pure air in the cylinder and injects the fuel after the compression is finished.

Both methods have disadvantages. If, as in the case of the gas engine, the fuel is introduced into the working cylinder during the suction stroke, it comes into contact with the lubricated walls of the cylinder in an unburnt state. If pulverized fuel is used it will adhere to the cylinder walls and will clog up the piston rings. If liquid fuel is used it will condense on the cooled cylinder walls in the form of drops, which evaporate slowly, and which will form coke. In the Diesel motor the time available for the combustion after the introduction of the fuel into the cylinder is very short, so that some kinds of fuel, for instance pulverized fuels burning more slowly, cannot be used with the method hitherto employed.

The present invention relates to a new method of operating combustion engines which combines the advantages of the two kinds of engines mentioned without possessing their disadvantages. My invention essentially consists first: in feeding the engine simultaneously or nearly simultaneously, with a current of fresh air to the main combustion chamber and with a current of finely divided pulverized fuel, or atomized liquid fuel, to a precombustion chamber. Both these chambers are connected. Second: in compressing the charges in both chambers simultaneously so that a quantity of hot air, sufficient for the combustion of a portion of the fuel during the compression, is pressed into the precombustion chamber where it heats the fuel contained therein and ignites a certain part of it.

Therefore, the fuel is charged to the precombustion chamber before the beginning of the compression so that a sufficiently long time is available for heating, ignition and complete combustion of the fuel, even though slowly burning kinds of fuel are used. However, as the fuel is not introduced immediately into the main combustion chamber but into a precombustion chamber, it cannot arrive at the lubricated walls of the cylinder in unignited state. On the contrary it passes over from the precombustion chamber to the main combustion chamber already ignited where it quickly burns completely, before it arrives at the walls of the working cylinder.

In engines of the reciprocating type the fuel is introduced into the precombustion chamber while the working cylinder is charged with fresh air. As during that time there is low pressure in the cylinder, only a low pressure is necessary for feeding the fuel to the precombustion chamber. This is of importance especially for pulverized fuels, because such fuels cannot be compressed and cannot be fed into the precombustion chamber against a high back pressure. Therefore, for fuels of that kind, the new method according to my invention is necessary. Another advantage of my method consists in the long heating period of the slowly kindling powder.

In four stroke cycle engines it is possible to use the small vacuum formed during the suction stroke for drawing in the fuel from the storage chamber to the precombustion chamber. In two stroke cycle engines preferably the pressure generated by the air scavenging pump may be used for introducing the fuel into the precombustion chamber.

A further object of my invention is to proportion the two charging currents and to shape the precombustion chamber in such a manner that the fuel is retained therein substantially to the end of the compression. Thus only air, or in the most unfavourable cases, air with a very small amount of the most finely divided fuel particles can pass from the precombustion chamber to the main combustion chamber.

My method has the advantage, that the fuel is retained in the precombustion chamber and is mixed during the compression stroke only with such a quantity of air as necessary for the first ignition. Because the ignition takes place within the precombustion chamber, this means at that place where the fuel is most concentrated, sure ignition is obtained even when running without load.

In the accompanying drawings several devices suitable for the employment of my method are diagrammatically shown.

Figure 4:
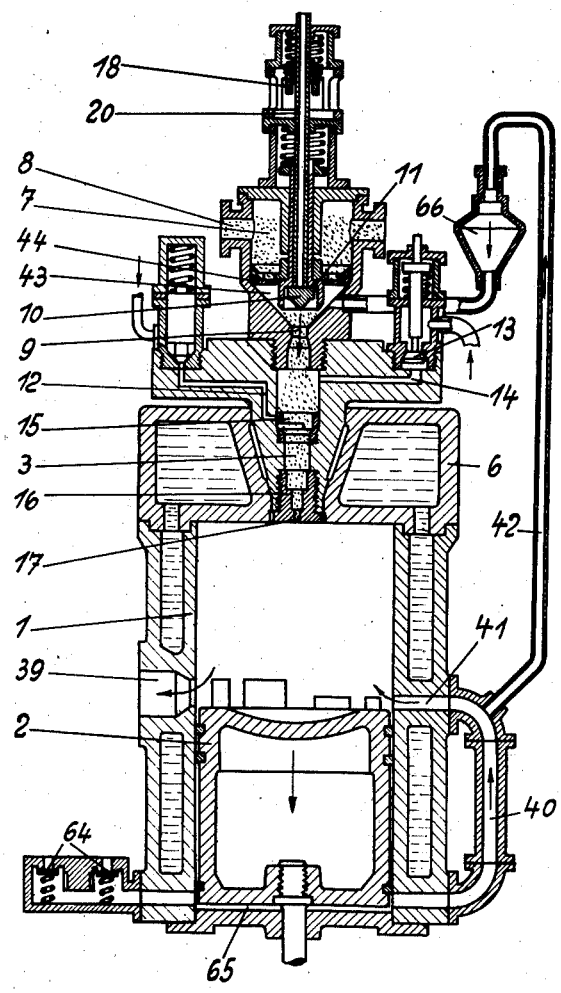

Figs. 1 and 2 are vertical sections through the cylinder head of a four stroke cycle engine, Figs. 3, 4 and 14 are similar sections through a two stroke cycle engine, Figs. 5–11 are vertical longitudinal sections and horizontal cross sections through several modifications of precombustion chambers according to my invention. Fig. 6 is a section to the line A—B of Fig. 5 and Fig. 8 is a section to the line C—D of Fig. 7.

Figs. 12 and 13 show diagrammatically a device especially suitable for operating the valve controlling the admission of the fuel-power.

The four stroke cycle engine according to the Figs. 1 and 2 as well as the two stroke cycle engine according to the Figs. 3, 4 and 14 are arranged for simultaneous or separate working with liquid and pulverous fuels. It is provided in the usual manner with a working cylinder 1, in which the working piston 2 moves up and down. A precombustion chamber 3 is connected to the working cylinder. In the case of the four stroke cycle engine, according to Figs. 1 and 2, suction and exhaust valves 4 and 5 respectively are provided. The cylinder cover 6, or the precombustion chamber 3 arranged therein, carries the storage chamber 7 for the pulverized fuel. The fuel is introduced in intimate mixture with some air by pipe 8 into the storage chamber 7, where it precipitates partially from the carrying air current and where it accumulates in a loose state. The outlet opening 9 of the storage chamber is closed by the geared charging valve of the precombustion chamber, which is preferably constructed in known manner as double valve 10 and 11. The precombustion chamber 3 is provided with a channel 12 for feeding a liquid fuel, and in some cases with the feed conduit 14 for compressed air controlled by the valve 13. For preventing an escape of oil from the channel 12 the outlet of the oil is closed by an elastic resilient annular valve 15 (ref. also Figs. 7 and 8) which opens only by the pressure of the fuel pump (not shown) for allowing a pre-determined quantity of liquid fuel to enter. The outlet of the precombustion chamber 3 leads to the working cylinder and is provided with an interchangeable inserted piece 16 having an offset passage and a nozzle 17.

In a four-stroke cycle engine, during the suction stroke, the air inlet valve 4 is opened and fresh air is sucked into the working cylinder (see Fig. 1, the position shown in dotted lines). But at the same time or nearly so, the geared charging valve 10 and 11 of the precombustion chamber 3 has also been opened. At first the governing lever 18 lifts the inner valve 10 so that a pressure which may exist in the precombustion chamber may escape to the atmosphere through the passages 19 and the hollow shank 20 of the valve 10 and 11. On its further movement the inner valve 10 takes with it also the outer valve 11 and frees the way for the pulverized fuel from the storage chamber 7 to the precombustion chamber (Fig. 2). During the suction stroke of the piston a vacuum is generated in the working cylinder. This vacuum sucks fresh air from the atmosphere to the working cylinder and it causes a pressure below the atmosphere to take place in the precombustion chamber, owing to its open nozzle 17. By this difference of pressure between the precombustion chamber 3 and the storage chamber 7 a quantity of the mixture of fuel and air, corresponding to the width and height of opening of the charging valve, is fed to the precombustion chamber. The two suction currents (fresh air to the working cylinder and the mixture of fuel and air to the precombustion chamber) may be proportioned to each other, for instance with respect to quantity, time and duration which may be effected by the governor. If, for instance, the fuel is difficult to move then the difference in pressure between the storage chamber 7 and the precombustion chamber 3 must be made as great as possible. This is accomplished if the inlet air valve 4 is not opened until the piston has completed a certain amount of its suction stroke. This increases the vacuum caused by the descending piston which acts intensively through the precombustion chamber 3 and opened charging valve 10 and 11 upon the fuel in the storage chamber 7 sucking it into the precombustion chamber. Not before a sufficient quantity of mixture of fuel has arrived at the precombustion chamber 3, is the suction valve 4 opened. The same effect is also obtained by throttling the free area of the channel for the air sucked into the cylinder. On the other hand, if mobile fuel is employed, the charging valve 10 and 11 which has been opened simultaneously, or nearly simultaneously, with the air valve 4, is closed sooner than the valve 4, when the quantity of fuel measured by the governor has been sucked into precombustion chamber.

The precombustion chamber 3 has preferably an elongated shape. The place, where the mixture of pulverized fuel and air is introduced is situated remote from the working cylinder so that the pulverized fuel is admitted in the direction of the longitudinal axis of the precombustion chamber. The distance between the inlet opening 9 of the precombustion chamber and the nozzle 17 is dimensioned and proportioned, according to my invention, so that the forces which convey the mixture of pulverized fuel and air to the precombustion chamber are consumed when the main quantity of the fuel has arrived at the nozzle 17. When the main quantity of the pulverized fuel has been sucked through the elongated precombustion chamber to the nozzle 17, the working piston has finished its suction stroke and begins to compress the air contained in the cylinder. The gradually increasing compression forces the air from the working cylinder, through the nozzle 17 into the precombustion chamber and keeps the fuel therein back. The open end of the precombustion chamber turned towards the working cylinder is provided furthermore with retarding or other arresting surfaces for the pupose of retaining the fuel. For instance, the opening 16 of the precombustion chamber is tapered in the form of a steps staircase towards the nozzle 17. The pulverized fuel hits the steps 16', 16", 16''' (Fig. 5) of this tapered passage when sucked in and flies back, for the greatest portion or is at least checked in its movement and retained. Within the precombustion chamber there occurs a separation of the mixture of fuel and air which has been sucked in from the storage chamber 7 on the down-stroke of the piston. The solid particles of the fuel which, on account of their mass, are thrown back or retained at the collision with the walls of the precombustion chamber remain for their main portion therein. Only the easily moved air which was mixed with the fuel can be drawn into the working cylinder. The steps 16', 16", 16''', enlarging towards the interior of the precombustion chamber, do not form any hindrance for the unchecked entrance of the compressed air from the working cylinder which enters through the nozzle 17.

The fuel remains in the precombustion chamber nearly to the end of the compression stroke, that is, in four stroke cycle engines during two strokes. The consequence of this long time which the fuel stays in the precombustion chamber is, that owing to the radiation of its hot walls and the hot compressed air penetrating into the precombustion chamber, it is well preheated and chemically decomposed. Thus the fuel is well prepared for a rapid combustion. By this heating and gasification the mixture of fuel and air expands. Therefore, the volume of the precombustion chamber must be dimensioned so that each charge of fuel, at full load, has sufficient room in addition to that of the air, which is forced from the working cylinder into the precombustion chamber during the compression stroke. This will prevent the fuel from being forced into the working cylinder on account of want of space during the storing period. For obtaining these conditions, according to my invention, the volume of the precombustion chamber must be within certain limits and in proportion to the volume of fresh air (based on atmospheric pressure). That is to say, in four stroke cycle engines it must be in proportion to the volume of the working cylinder and to the final pressure of compression provided the engine is not supercharged with air. In practice, ordinarily a final pressure of about 28–32 atmospheres is employed. Therefore, it is sufficient to consider this compression for the dimensioning of the precombustion chamber. The volume of the precombustion chamber is therefore, according to my invention, .004 to .015 of the volume of fresh air of the working cylinder, provided that the fresh air of the working cylinder is under atmospheric pressure. The precombustion chamber must be enlarged correspondingly, if the fresh air has a pressure above atmosphere when entering the working cylinder.

The mixture of pulverized fuel and air becomes ignited within the precombustion chamber. The quantity of fuel being burned within the precombustion chamber depends on the weight of the air present therein at the end of the compression stroke. This air being limited, only a portion of the fuel fed into the precombustion chamber will burn therein. If the volume of the precombustion chamber is dimensioned according to my invention, the main portion of the fuel stored in it does not yet burn in the precombustion chamber on account of the lack of sufficient oxygen, but it is only heated above the temperature of self-ignition. This highly heated and decomposed fuel is immediately burned when it comes in contact with the air charge contained in the working cylinder. The air necessary for igniting one portion of the fuel contained in the precombustion chamber enters said chamber during the compression stroke from the working cylinder through the open nozzle 17. However, this air may also be introduced, totally or partially, from the outside into the precombustion chamber, for instance by admitting air mixed with the fuel or by admitting separate air by means of a special valve.

If the precombustion chamber receives an air volume as outlined above just such a portion of the fuel may be ignited and burned within said chamber that the increase of pressure generated thereby is sufficient to overcome the final pressure of the compressed air in the working cylinder. This throws the total contents of the precombustion chamber into the main combustion chamber, whereby it is eddied and atomized (self-injected). Hereby the increase of pressure in the precombustion chamber remains smaller during the compression stroke than the pressure in the working cylinder. The pressure in the precombustion chamber at first overcomes the pressure in the working cylinder at the end of the compression stroke so that then the pressure in the precombustion chamber throws the contents into the working cylinder.

If the lower limit of the volume of the precombustion chamber is determined by the weight of air necessary for igniting a portion of the fuel therein, said volume should not be made too large. Otherwise the quantity of fuel burned therein and the losses of heat through the walls of the precombustion chamber would become too great. Especially at small loads, the whole quantity of fuel would burn in the precombustion chamber and nothing would remain to be injected into the main combustion chamber.

The beginning of the ignition of a portion of the fuel in the precombustion chamber is determined (by calculation and experience) essentially by the final temperature of the weight of air forced from the working cylinder into the precombustion chamber. This weight depends upon the volume of the precombustion chamber, being relatively large according to my invention, and also on the throttling effect of the nozzle 17. This volume always remains the same regardless of the load of the engine. Thus it is evident that the beginning of the ignition in the precombustion chamber, and therefore the extent and the moment of the self-injection, is practically independent of the load and also of the difference between the temperature of the precombustion chamber at the start and during normal working of the engine. With a precombustion chamber dimensioned according to my invention, efficient starting ignition is obtained, so that additional ignition devices can be dispensed with for starting. The precombustion chamber, on the contrary, must be kept at a relatively low temperature by cooling the same sufficiently.

The cooling of the precombustion chamber is effected in the manner shown of Figs. 5 and 8. Water passes through holes 21. The upper ends of these holes are connected to an annular passage 22, which is connected to two pipes 23 arranged near each other, one of which is the inlet pipe for the cooling water, whilst the other is the outlet pipe. The lower ends of the holes 21 are connected by an annular passage 24 in the wall of the precombustion chamber which is made in two parts, for obtaining a particularly good circulation of the cooling water. These two parts are pressed together with a seal ring 25 between them. Figs. 7 and 8 show the precombustion chamber cooled in a similar manner, so arranged that it may be removed from the cylinder cover 6 without enabling the water to enter the working cylinder. In Fig. 9 the cooling water of the cylinder cover 6 flows also through passages 26 and 27 and round the wall of the precombustion chamber. The passages 26 and 27 may be closed by valves 28 and 29, so that the cooling water can be shut off before the removal of the precombustion chamber. By the aid of the valves 28 and 29, furthermore, the flow of the cooling water may be controlled, and the wall of the precombustion chamber is thus more or less cooled.

The most suitable ratio of the precombustion chamber volume to the fresh air volume which, according to my invention, is within .004 to .015, may easily be found for the various kinds of fuel by an experiment with precombustion chambers of different size. In a four stroke cycle engine of, for instance, 420 mm cylinder diameter and 630 mm stroke, the working piston always sucks a volume of $(\pi \times .420^2) \div 4 \times .630 = 87.3$ litres multiplied by the volumetric efficiency. This efficiency may vary between .7 to .98. Assuming a volumetric efficiency of .7 the actual volume of the air which is drawn into the working cylinder therefore equals $.7 \times 87.3 = 61.1$ litres. The capacity of the precombustion chamber therefore must be in this case between .004 and .015 of 61.1 litres, that is between .24 and .92 litre. The exact ratio depends on the ignition temperature of the fuel, on the degree of pulverization of the powdered fuel (or on the degree of atomization of the liquid fuel) and on the resistance to the flow through the nozzle 17. The coarser the pulverized fuel, or the coaser the atomization of the liquid fuel which enters the precombustion chamber, the more must the volume of the precombustion chamber approach the upper limit, because for the heating and ignition of the larger fuel particles a greater quantity of heat is necessary. This heat will be present only in a larger precombustion chamber, resulting in a greater weight of air introduced from the working cylinder. A precombustion chamber of greater volume retains a greater weight of hot gases from the preceding ignitions which will heat the fuel to a greater extent from the moment of its arrival in the precombustion chamber to the end of the compression stroke. Furthermore, the smaller the nozzle 17 is made, the higher must be the pressure for self-ignition in the precombustion chamber, for the purpose of injecting its contents against the resistance caused by nozzle. This requires a greater weight of air, which the precombustion chamber must receive in order to generate the increased pressure therein.

It is possible to determine the most favourable size of the precombustion chamber by varying its volume. For this purpose the precombustion chamber may be provided with separate chambers which according to requirement, may or may not be added to it. For this purpose the precombustion chamber may be provided with a movable piston 30, shown in Fig. 11, which according to its position, enlarges or reduces the volume of the precombustion chamber.

Figure 10:
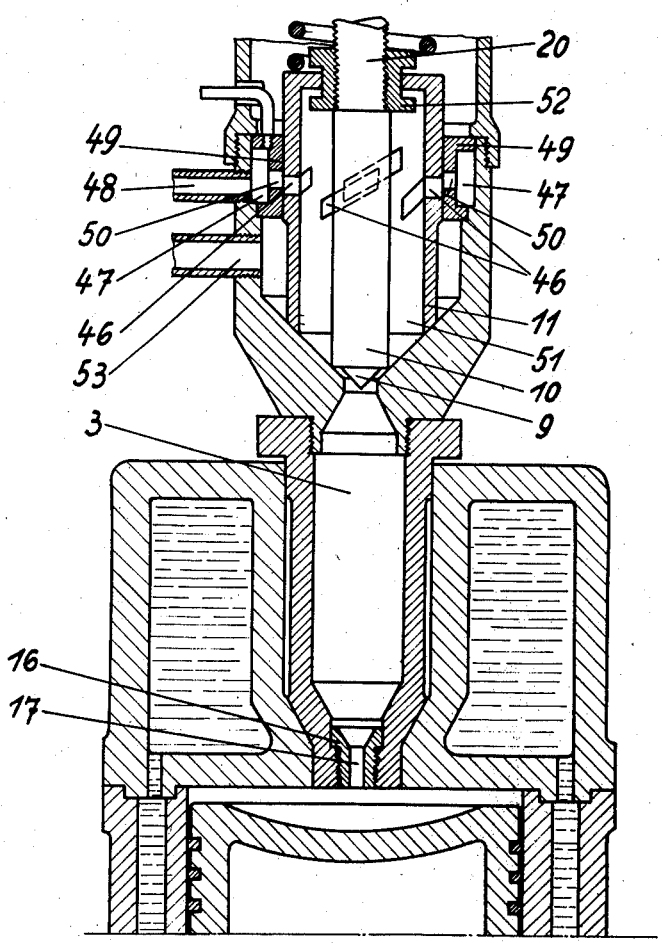
Figure 11:
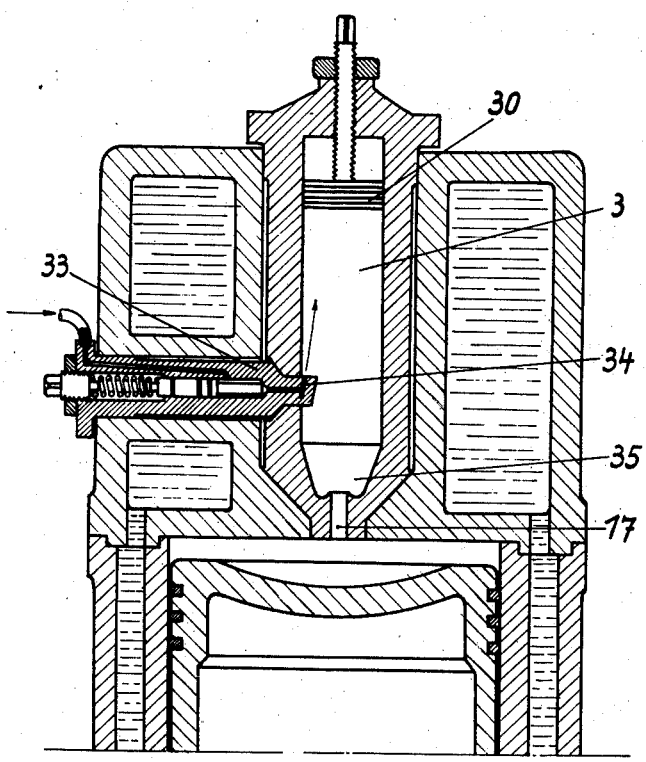

The beginning of the ignition in the precombustion chamber and the injection pressure therein may further be varied within certain limits independent of the volume of the precombustion chamber by changing the resistance of the nozzle 17. A fine adjustment of the precombustion chamber may hereby be obtained. For this purpose the member 16 of the precombustion chamber is interchangeable (Figs. 1-4, also 5 and 10) in order to vary nozzle size according to the fuel used. Fig. 10 shows, in an advantageous manner, the member 16 screwed in so that the pressure in the precombustion chamber cannot throw it into the working cylinder if it should become loose. The engine may also be provided with a device for varying the nozzle opening during the running of the engine, as shown in Fig. 9. The device may consist of a throttle screw 31 being adjustable from the outside projecting into the nozzle. According to how deep the throttle-screw 31 projects into the nozzle its free passage is diminished or increased to suit the fuel used. If, for instance, with a more inflammable fuel, premature ignitions occur in the working cylinder, then the passage of the nozzle must be throttled, in order that the pressure in the precombustion chamber may not be obtained too early. By this method the pressure in the precombustion chamber reaches sufficient height for the self-ignition more slowly, and at the same time the resistance against the ejection of the fuel is increased. Both circumstances combine for retarding the beginning of the ignition in the precombustion chamber and the self-ejection until the end of the compression is reached. If, however, a fuel is employed which ignites more slowly, for instance coarsely pulverized coal, the nozzle opening may be enlarged correspondingly. Then the hot air contained in the working cylinder arrives more quickly in the precombustion chamber and the fuel receives the heat necessary for igniting earlier. It may be said, that in most cases a premature ejection from the precombustion chamber may be adjusted by decreasing the nozzle opening if the weight of the air therein is too great or if the fuel ignites too quickly.

Such a throttling device 31 in the nozzle (Fig. 9) may be operated by an automatic gear which narrows or totally closes the nozzle during the charging of fuel into the precombustion chamber or soon after and opens it again at the beginning of the compression. In this case no fuel can reach the working cylinder during the suction stroke and there cause premature ignition during the compression stroke. In large slow running engines it is advisable not to effect the ventilation of the precombustion chamber through the nozzle for the purpose of obtaining a difference in pressure between the fuel storage chamber and the precombustion chamber. In this case the throttling device 31 may be closed during the charging period of the precombustion chamber with fuel and the requisite vacuum may be obtained by means of a special air-discharging opening leading into the atmosphere.

If desired it is possible, according to my invention, to dispense with self-injection. In this case, the fuel ignited in the precombustion chamber will be ejected by the aid of compressed air, which is admitted to the precombustion chamber by the pipe 14 and the geared valve 13. The injection air increases the pressure in the precombustion chamber, present therein through partial combustion, which pressure may otherwise not be sufficient for the self-ejection. The air injection method is especially adapted for slowly igniting fuel or when the weight of air in the precombustion chamber is insufficient. The consumption of injection air is relatively small, because it does not create the total pressure in the precombustion chamber, but only supplements the pressure already obtained by the partial combustion therein. The injection air, supplied to the precombustion chamber, does not only effect a direct increase of pressure, but it also assists the combustion of a further portion of fuel therein by supplying the oxygen necessary therefor, whereby the pressure in the precombustion chamber is increased. In cases where the increase of pressure in the precombustion chamber, by partial combustion, is great enough for ejecting the total contents therein, an instantaneous opening of the valve 13 may be advisable to secure the proper moment of self-ejection.

The pulverized fuel is preferably applied to the oblong precombustion chamber at the end opposite the nozzle as shown in the drawings. As the filling valve 10 and 11 for the pulverized fuel is arranged in a position just stated the valve for the injection of the oil must be arranged at some different place, for instance at the long side-wall. Here attention must be paid that the oil, which is injected in a finely atomized state, is not allowed to arrive at the opposite wall of the precombustion chamber because it would precipitate there in the form of large drops, which vaporize and ignite slowly. According to Figs. 7 and 8 the outlet of the oil feed-passage 12 which is arranged nearly in the middle of the precombustion chamber is closed by an annular check valve 15. This valve tightly fits the inner side of the cooled wall of the precombustion chamber so that it requires only a small space and is protected from excessive heating. It opens by the pressure of the fuel pump not shown. When injected into the precombustion chamber the oil will be atomized by the annular valve 15 and simultaneously deflected upward and downward in the direction of the arrows, which is approximately in the direction of the axis of the precombustion chamber, see Fig. 7. In Fig. 5 the liquid fuel is supplied by a transversely arranged passage 33 and 34 in the upper part of the precombustion chamber. The end of this passage is directed downward so that the jet of oil, which is discharged in finely atomized state, injects towards the longitudinal axis of the precombustion chamber. The deflecting faces 16′, 16″ and 16‴ prevent the jet from immediately entering the working cylinder. According to Fig. 11 the oil is injected through the opening 34 in the lower part of the precombustion chamber, and directed upwards. The oil is here injected towards the interior of the precombustion chamber, that away from the nozzle 17. By this arrangement it will positively be prevented, that the injected oil immediately enters the working cylinder. The wall of the precombustion chamber around the nozzle 17 forms a groove 35, serving as a deflecting face and hindrance for the fuel charge. The groove 35 gathers the oil which may precipitate and prevents it from flowing too quickly into the working cylinder. This oil is evaporated during the next compression stroke and is therefore not lost. Fig. 9 shows an especially advantageous oil-feed. Here the oil passage 36 is arranged in the valve spindle 20. An automatic check-valve 37 and an atomizer 38 is located in the valve 10.

The shown precombustion chamber may be used, according to my invention, either only for liquid fuels or only for pulverized fuels. It is also possible to employ a pulverized and a liquid fuel simultaneously, or one after the other. The liquid fuel, in this case may serve as a pilot or ignition fuel. If an easily inflammable pilot oil and a difficultly kindling working fuel (powdered fuel) are employed, the latter only needs to be fed to the precombustion chamber during the suction stroke, and the easily ignited pilot fuel may be fed at a later time, during or at the end of the compression stroke. The simultaneous use of powdered fuel and liquid fuel in a common precombustion chamber is possible, according to my invention, because the easily ignited pilot oil will be supplied not in a liquid state, but in a finely atomized state or mist. If the fuel were not introduced in a fine mist, the powder would be moistened by the oil, making it sticky and difficult to move and to combust.

In two stroke cycle engines, according to Figs. 3 and 4, insufficient vacuum will exist during any part of the cycle so that the fuel cannot be sucked from the storage chamber 7 into the precombustion chamber 3 by the working piston 2. In this case the customary scavenging pump 65 may be used for feeding the fuel to the precombustion chamber 3. The working piston opens on its downward movement the exhaust ports 39 (Fig. 4) just before its lowest position. The exhaust gases escape from the working cylinder through said ports. During the downward movement the lower part of the piston, acting as scavenging piston, has compressed the fresh air previously sucked into its cylinder 65. This air passes through the duct 40 into the working cylinder, when the piston opens the inlet ports 41. The branch pipe 42 is connected to the duct 40. It leads to a chamber 43 arranged between the fuel storage chamber 7 and the precombustion chamber. This chamber 43 may be shut off from the storage chamber 7 by means of the automatic valves 44. The branch pipe 42 may be provided with a safety check valve.

Fresh air is sucked into the scavenging pump cylinder 65 on the upward movement of the working piston through the valves 64. The vacuum, generated thereby in the scavenging pump, is transmitted through the pipes 40 and 42 and chamber 43 (Fig. 3). Thus a vacuum is caused in the chamber 43 whilst in the storage chamber 7 atmospheric or a somewhat higher pressure prevails. This difference in pressure between chamber 43 and storage chamber 7 opens the automatic valves 44 and conveys a predetermined quantity of pulverized fuel from the storage chamber 7 to the chamber 43.

The working piston during this time has reached its highest position as shown in Fig. 3 and begins to return. At the same time the suction stroke of the scavenging pump is finished and the air therein begins to be compressed. The vacuum in the pipe 40 now ceases and the scavenging pump begins to create a pressure therein. Under the action of this pressure the automatic valves 44 in the chamber 43 close and the fuel storage chamber 7 is again shut off. In order to prevent air, which pulsates to and fro in the pipe 42, from drawing fuel powder from the chamber 43 to the inlet ports 41 a sifting or damping device 66 is arranged. This device separates the fuel powder from the air current and retains those particles of this powder which have been dragged to this place.

When the piston has reached its lowest position (Fig. 4) it opens the air inlet ports to the working cylinder and the scavenging air enters under pressure through the pipe 40 into the cylinder. This dispels the exhaust gases, replacing them with fresh air. The air entering the working cylinder through the scavenging ports 41 has not enough pressure to enter the precombustion chamber through the narrow nozzle 17. At, or nearly at, the same time, when the piston reaches its lowest position, the valve 10 and 11 for charging the precombustion chamber has been opened. After the opening of these valves the pressure present in the pipe 42 and in the chamber 43 exceeds that in the precombustion chamber so that the loose pulverized fuel previously measured off from the storage chamber 7 and encircling the filling valve 10 and 11 is blown through the open charging valves into the precombustion chamber. In the precombustion chamber the fuel is thus stored and prepared for ignition in the above described manner. Instead of using the customary air-scavenging pump 65 a special air compressor may be employed for measuring off the charge from the fuel storage and for injecting same into the precombustion chamber.

It is also possible to convey the charging air current to the precombustion chamber through or along the fuel storage chamber in a similar manner as in gas engines so that the charging air current, enriched with fuel, is sucked or forced into the precombustion chamber.

Fig. 10 shows such an arrangement. The outer valve 11 of the filling valves possesses oblique slots 46 terminating in an annular channel 47 which is connected with the atmosphere by the pipe 48. A rotary sleeve 49, surrounding the sleeve valve 11, is provided with openings 50 corresponding in shape to the air ports 46. When the inner valve 10 is lifted, during the suction stroke of the working piston an air current is sucked into the precombustion chamber from the atmosphere through the pipe 48, the annular channel 47, the slots 50 and 46 and through the annular space between the valves 10 and 11. The rising valve 10 then lifts the sleeve valve 11 by the shoulder 52. This permits the air current to act as an ejector sucking the fuel through the fuel pipe 53 into the precombustion chamber. In order to control the force and the duration of the sucking air current, and therefore also the quantity of the fuel, the sleeve 49 may be adjusted by hand or by the governor. According to this adjustment the slots 46 and 50 overlap more or less and are closed sooner or later during the rising of the sleeve valve 11.

In the two stroke cycle engine, according to Fig. 14, the scavenging pump 65 causes a current of compressed air to flow into the precombustion chamber 3 through the annular channel 47, the slots 46, and the annular space 51. This air current acts like an ejector upon the powdered fuel in the storage chamber 7 and sucks a corresponding portion of said fuel into the precombustion chamber.

In Figs. 7 and 9 conveyor screws 45 are arranged adjacent to the filling valve 10 and 11. These devices mix the fuel powder, supplied from the storage chamber, with the air, making it loose and throwing it by centrifugal action into the precombustion chamber when the filling valves 10 and 11 are opened. These conveyor screws assist therefore the air which sucks the fuel into precombustion chamber. A detailed description of these devices and their functioning will be found in my previous United States Patent No. 1,656,678.

If the engine is to be operated with pulverized fuels only, the oil pump must be stopped or by-passed. In this case it is possible to use the pressure impulses of the oil pump for operating the filling valves 10 and 11 as shown in Figs. 12 and 13. According to Fig. 12 the fuel oil pump sucks oil through the pipe 55 and forces it into the pipe 56 in the usual manner. A three-way cock 57 is arranged in the latter pipe, which is connected to two pipes 58 and 59. The three-way cock 57, according to its position, opens the way for the pressure impulses of the pump to the pipes 58 or 59. If the engine is driven by fuel oil, the pump 54 forces liquid fuel into the precombustion chamber through the pipe 58 and the annular check valve 15. The pipe 58 is provided with a check-valve 60, which prevents a back flow of the oil forced into the passage 12.

If the engine is to be operated with pulverized fuel only, the three-way cock 57 is turned into the position shown in Fig. 12, in which it connects the pipes 56 and 59. In this position the pressure impulses of the pump 54 act upon a piston 61, which is secured to the valve spindle 20. The piston 61 receives an impulse at each downward movement of the plunger 63 of the oil pump by which the filling valves 10 and 11 are lifted. The pump plunger 63 sucks the oil column in the pipes 56 and 59 back during its upward movement so that the oil pressure below the piston 61 decreases, permitting the filling valves 10 and 11 to reclose. The plunger 63 of the pump always sucks from the storage tank such a quantity of fresh oil through the pipe 55 as is lost by leakage in the pipes 56 and 59 and in the cylinder 62. The pump plunger 63 is under the control of the governor, which varies its stroke and therefore the quantity of oil forced into the cylinder 62.

Fig. 13 represents a controlling device in which the hand lever shown in full lines represents the position in which the engine is working on fuel oil. The plunger 63 of the oil pump 54 is operated by a cam-shaft 67. The plunger is under the control of the governor by the tension rod 68 which, according to the load of the engine, raises or lowers the lever 69 with its set-screw 70 more or less. This set screw acts upon the shank 71 of the by-pass valve 72. When the pump plunger 63 is lifted, the set-screw 70 comes into contact with the shank 71 opening the overflow-valve 72 sooner or later and the quantity of the oil forced into the pipe 56 becoming less or more depending on the position of the governor, not shown.

When working with pulverized fuel, the hand-lever 73 is brought into the position, shown by a dotted line, whereby the three-way cock 57 is turned by the tension-rod 74, so that it establishes a communication between the pipes 56 and 59. In consequence of the excentric hand lever shaft, the fulcrum 75 of the governor lever may be changed, for instance lowered into the position 75', so that the lever 69 is also lowered and the set screw 70 partially removed from the shank 71 of the by-pass valve 72. The pump plunger will now, when lifted by the cam of the shaft, deliver more fuel oil because the set screw 10 comes in contact with the shank 71 later, whereby a smaller quantity of oil is by-passed. This is necessary, because considerably more oil is necessary for the operation of the filling-valves 10 and 11 than when pump delivers the fuel oil to the precombustion chamber, while the engine is operated by fuel oil.

Instead of employing the usual fuel injection pump for operating the filling valves 10 and 11, a special pump may be provided for this purpose. This special pump will work better with lubricating oil, than with fuel oil. The operation of these two pumps can be regulated by means of the hand lever 13, Fig. 13, so that either only the fuel injection oil pump, or only the special pump for operating the filling valves 10 and 11, or both pumps work. In the latter case the controlling hand-lever would be placed into an intermediate position.

Instead of arranging the precombustion chamber in the cylinder cover, it may also be formed by a cavity in the working piston. Also the exhaust and inlet valves, which are usually arranged in the cylinder cover, may be arranged at the precombustion chamber 3.

The methods according to my invention are applicable not only to engines of the reciprocating type, but also to combustion-turbines. Here other means than a piston for compressing the contents in the main combustion chamber and in the precombustion chamber may be used. The combustion turbine, for instance may be provided with main combustion chambers and precombustion chambers, the first of which are charged with air, the latter with air and fuel, whereby the compression in both chambers and the ignition in the precombustion chambers is effected by pressure impulses from the neighbouring combustion chamber.

What I claim is:

1. In an internal combustion engine, the combination of a working cylinder, a precombustion chamber connected to the said working cylinder by an open nozzle, a filling valve for admitting into the said precombustion chamber loose aerated pulverulent fuel, means for opening the said filling valve during the period of low pressure in the said working cylinder, means for retaining the charge of air and powder in the precombustion chamber until the end of the compression period, means for producing an overpressure in the said precombustion chamber at the end of the compression period in order to project the contents of the precombustion chamber into the working cylinder.

2. In an internal combustion engine for pulverulent fuel, a working cylinder, a precombustion chamber connected to said working cylinder by an open nozzle, the said precombustion chamber being so proportioned that its size is approximately 0.4 to 1.5% of the volume of fresh air in the working cylinder (reckoned at atmospheric pressure), so that the delivered charge of fuel in the precombustion chamber has sufficient room and notwithstanding the increase of its volume by heating, gasification and evaporation, is not ejected into the working cylinder before the end of compression whilst moreover there is sufficient fresh air in the precombustion chamber as is necessary for igniting a portion of the fuel therein.

3. In a combustion engine for liquid or pulverized fuel, the combination of a working cylinder, a precombustion chamber, and controlled devices for the admission of liquid and pulverized fuels to said chamber adapted to operate the engine either with liquid or pulverized fuel or with both.

4. In a combustion engine for liquid or pulverized fuels the combination of a working cylinder, a precombustion chamber, and automatic devices for the admission of liquid and pulverized fuels to said chamber for operating the engine conveniently either with liquid or pulverized fuel or with both.

5. In a combustion engine for liquid or pulverized fuels the combination of a working cylinder, a precombustion chamber, having an outlet which increases in resistance in the direction towards the working cylinder, a fuel storage chamber and a device for controlling the passage between said storage chamber and said precombustion chamber.

6. In a combustion engine for liquid or pulverized fuels the combination of a working cylinder, a precombustion chamber, having an outlet which increases in resistance in the direction towards the working cylinder caused by impact surfaces or the like for the purpose of preventing a premature exit of the fuel into the working cylinder; a fuel storage chamber and a controllable passage between said storage chamber and said precombustion chamber.

7. In a combustion engine for liquid or pulverized fuels the combination of a working cylinder, a precombustion chamber tapering in steps and increasing in resistance in the direction towards the working cylinder; a fuel storage chamber and a controllable passage between said storage chamber and said precombustion chamber.

8. In a combustion engine for liquid or pulverized fuels the combination of a working cylinder, a precombustion chamber, a mouth-piece inserted in the lower end of said chamber adjustable in width, a fuel storage chamber, and a controllable outlet between said storage chamber and said precombustion chamber.

9. In a combustion engine for liquid or pulverized fuels the combination of a working cylinder, a precombustion chamber, a nozzle, means for varying the aperture of said nozzle while the engine is in operation, a fuel storage chamber, and a controllable passage between said storage chamber and said precombustion chamber.

10. In a combustion engine for liquid or pulverized fuels the combination of a working cylinder, a precombustion chamber, an automatically controlled shutting off device for the nozzle which closes when feeding said chamber with fuel and which opens at the beginning of the compression holding back the contents of said chamber by means of the compressed air flowing from the working cylinder into the said chamber, a fuel storage chamber, and a mechanically operated shutting off device between said storage chamber and said precombustion chamber.

11. In a combustion engine for liquid or pulverized fuels the combination of a working cylinder, a precombustion chamber, an automatically controlled device which decreases the nozzle opening at the time of feeding said chamber with fuel and which increases same when the precompressed air flowing from the working cylinder into said chamber begins to hold back the contents therein, a fuel storage chamber, and a controllable outlet between said storage chamber and said precombustion chamber.

12. In an internal combustion engine a combination of a working cylinder, a precombustion chamber, devices for feeding finely atomized liquid and aerated pulverulent fuels into the precombustion chamber, means for simultaneously actuating the feeding members for liquid and pulverulent fuel thereby producing in the said precombustion chamber a mixture of atomized oil and pulverized substance finely divided in air, the said mixture being jointly prepared in the precombustion chamber for ignition.

13. In an internal combustion engine the combination of a working cylinder, a precombustion chamber, devices for feeding into said precombustion chamber finely atomized liquid fuel and aerated pulverulent fuel, means for simultaneously actuating the delivery members for liquid and pulverulent fuel, the said delivery members entering into different places in the precombustion chamber in such a way that the streams of liquid and pulverulent fuel impinge against each other within the precombustion chamber, and their energy of flow is thereby retarded whereby a mixture of atomized oil and pulverized substance finely divided in air is formed in the precombustion chamber, the said mixture being jointly prepared in the precombustion chamber for ignition.

14. In an internal combustion engine, the combination of a working cylinder, a precombustion chamber, devices for feeding into the said precombustion chamber finely atomized liquid fuel and aerated pulverized fuel, means for actuating the delivery members for liquid and pulverized fuel in such a way that the slow burning fuel is thrown into the precombustion chamber when the working cylinder is at low pressure whereas the quicker igniting fuel is only added later.

15. In an internal combustion engine, a working cylinder, a precombustion chamber, a filling valve for admitting loose aerated pulverized fuel into the precombustion chamber, means for opening the powder filling valve during the time of low pressure in the working cylinder, means for holding back the charge of powder and air in the precombustion chamber until the end of the compression period, means for introducing fresh air into the precombustion chamber so that at the end of compression self-ignition of a portion of fuel and a correspondingly high overpressure is produced in the precombustion chamber, which suffices to feed the contents of the precombustion chamber into the working cylinder even during the starting of the machine and when the precombustion chamber is cold.

16. In an internal combustion engine, a working cylinder, a precombustion chamber, a filling valve for admitting loose aerated pulverized fuel into the precombustion chamber, means for opening the powder filling valve during the time of low pressure in the working cylinder, means for holding back the charge of powder and air in the precombustion chamber until the end of the compression period, means for introducing fresh air into the precombustion chamber so that at the end of compression a portion of the contents of the precombustion chamber burns therein, and a device for introducing compressed air into the precombustion chamber in order that the over-pressure therein produced by a partial burning of the fuel is raised to such a degree that the contents of the precombustion chamber are thrown into the working cylinder.

17. In a combustion engine for liquid or pulverized fuels the combination of a working cylinder, a precombustion chamber, automatic devices for the admission of liquid and pulverized fuels to said chamber for operating the engine conveniently either with liquid or pulverized fuel or with both and a passage for the admission of compressed air to said chamber.

18. In a combustion engine for liquid or pulverized fuels the combination of a working cylinder, a precombustion chamber, a fuel storage chamber, a geared valve between both chambers for the feeding of pulverized fuel to the precombustion chamber, and passages for the admission of liquid fuel and compressed air to said precombustion chamber.

19. In a combustion engine for liquid or pulverized fuels the combination of a working cylinder, a precombustion chamber, a fuel storage chamber, a geared valve between both chambers for the feeding of pulverized fuel to said precombustion chamber, a hollow spindle of said valve for supplying the liquid fuel to said precombustion chamber.

20. In a combustion engine for liquid or pulverized fuels, a working cylinder, a precombustion chamber, a passage connected therewith adapted for generating a vacuum therein sufficient for sucking fuel even if the nozzle should be closed during the feeding of the fuel, a fuel storage chamber and a controllable passage between said storage chamber and said precombustion chamber.

21. In a combustion engine for liquid or pulverized fuel the combination of a working cylinder, a precombustion chamber, an adjustable piston movable in said chamber for varying its volume, a fuel storage chamber and a controllable shutting off device between said storage chamber and said precombustion chamber.

22. In a combustion engine for liquid or pulverized fuels the combination of a working cylinder, a precombustion chamber, additional rooms which may be added to said chamber for varying its volume, a fuel storage chamber, and a controllable shutting off device between both chambers.

23. In a combustion engine for liquid or pulverized fuels the combination of a working cylinder, a precombustion chamber, a fuel storage chamber for pulverulent fuel, a connection between both chambers, and a geared valve which shuts off said connection and determines the quantity of fuel and additional air to be together fed to said precombustion chamber.

24. In a combustion engine for liquid or pulverized fuels the combination of a working cylinder, a precombustion chamber, a fuel storage chamber, a connection between both chambers, a geared valve of the double type which shuts off said connection and determines the quantity of fuel to be fed, and an intermediate space between the double valves through which additional air is fed.

25. In a combustion engine for liquid or pulverized fuels the combination of a working cylinder, a precombustion chamber, a fuel storage chamber, a connection between both chambers, a geared valve of the double type which shuts off said connection and determines the quantity of fuel to be fed, and variable ports in the outer part of said double valve adapted to control the quantity of additional air admitted to the precombustion chamber and to control the duration of this air-current.

26. In a combustion engine for liquid or pulverized fuels the combination of a working cylinder, a precombustion chamber, a fuel storage chamber, a connection between both chambers, a geared valve of the double type, which shuts off the said connection and determines the quantity of fuel to be fed, inclined ports in the outer part of said double valve, a stationary but rotatable sleeve surrounding said outer valve, and corresponding ports in said sleeve co-operating with the ports of said outer valve for controlling the area of the air passages and the duration of the air-current.

27. In a combustion engine for liquid or pulverized fuels the combination of a working cylinder, a precombustion chamber, a fuel storage chamber, a connection between both chambers, a geared valve which shuts off the said connection and determines the quantity of fuel and additional air to be together fed to said precombustion chamber, said valve being arranged in the direction of the longitudinal axis of the precombustion chamber, an outlet in the side-wall of the latter chamber for laterally injecting the liquid fuel, and orifices in said outlet arranged approximately in the direction of longitudinal axis of said precombustion chamber adapted to prevent the liquid fuel from coming in contact with the opposite side-wall of the latter chamber.

28. In a combustion engine for liquid or pulverized fuels the combination of a working cylinder, a precombustion chamber, a fuel storage chamber, a connection between both chambers, a geared valve which shuts off said connection and determines the quantity of fuel and additional air to be together fed, said valve being arranged in the direction of the longitudinal axis of said precombustion chamber, a passage in the side-wall of the latter chamber for the supply of liquid fuel, and an annular check valve in the interior of the latter chamber shutting off said passage and deflecting the atomized fuel jet approximately in the direction of the longitudinal axis of said precombustion chamber, so that the spray of fuel cannot reach the opposite side-wall of said precombustion chamber.

29. In a combustion engine for liquid or pulverized fuels the combination of a working cylinder, a precombustion chamber, passages for the cooling water in the wall of said chamber, an upper annular passage connected to the supply pipe for the cooling water and connecting the upper ends of said passages, a fuel storage chamber, a connection between both chambers, and a geared valve which shuts off the said connection and determines the quantity of fuel and additional air to be together fed to the said precombustion chamber.

30. In a combustion engine for liquid or pulverized fuels the combination of a working cylinder, a precombustion chamber, passages for the cooling water in the wall of said chamber, an upper and a lower annular passage connected to the cooling water and connecting the upper and lower ends of said passages, a fuel storage chamber, a connection between both chambers, and a geared valve which shuts off the said connection and determines the quantity of fuel and additional air to be together fed to said precombustion chamber.

31. In a combustion engine for liquid or pulverized fuels the combination of a working cylinder, a precombustion chamber arranged in the cover of said cylinder, a space between the side walls of said chamber and the surrounding cylinder cover, a valve controlling the flow of the cooling water from the cylinder cover into said space, a fuel storage chamber, a connection between both chambers, and a geared valve which shuts off the connection and determines the quantity of fuel and additional air together fed to said precombustion chamber.

32. In a combustion engine for liquid or pulverized fuels the combination of a working cylinder, a precombustion chamber, a fuel storage chamber, a compartment between both chambers, means which first generate a vacuum in said compartment for sucking a corresponding quantity of fuel from the storage chamber through an inlet valve, and then feeding this quantity of fuel by means of air to the said precombustion chamber through the geared filling valve during the charging of the working cylinder with fresh air.

33. In a combustion engine for liquid or pulverized fuel the combination of a working cylinder, a precombustion chamber, a fuel storage chamber, a filling valve between both chambers, a separate compartment between said chambers, a suction and discharge pump (in the case of two-stroke cycle engines a scavenging pump) for sucking fuel from the storage chamber to the precombustion chamber, and a nozzle between said precombustion chamber and the working cylinder for supplying a quantity of air to said precombustion chamber during the compression stroke sufficient for igniting a portion of the fuel therein.

34. In a combustion engine for liquid or pulverized fuels the combination of a working cylinder, a precombustion chamber, a fuel storage chamber, a filling valve between both chambers, a suction channel in said precombustion chamber connected to the scavenging pump in two-stroke cycle engines to create a vacuum in said precombustion chamber, and a nozzle between said precombustion chamber and the working cylinder for supplying a quantity of air to said precombustion chamber during the compression stroke sufficient for igniting a portion of the fuel therein.

35. In a combustion engine for liquid or pulverized fuels the combination of a working cylinder, a precombustion chamber, a fuel storage chamber, a filling valve between both chambers, a passage for the admission of liquid fuel to said precombustion chamber, an oil pump connected to said passage, and a two way control inserted in the feed pipe of the oil pump so that the quantity of liquid fuel controlled by the governor may actuate the filling valve, if the engine is operating with pulverized fuel.

36. In a combustion engine for liquid or pulverized fuels the combination of a working cylinder, a precombustion chamber, a fuel storage chamber, a filling valve between both chambers, a passage for the admission of liquid fuel to said precombustion chamber, an oil pump connected to said passage, a two way control inserted in the feed pipe of the oil pump, the plunger of which may be governed in such a manner that it feeds a greater quantity of oil when it operates the said filling valve than when the oil is injected directly into the precombustion chamber.

37. In a combustion engine for liquid or pulverized fuels the combination of a working cylinder, a precombustion chamber, a fuel storage chamber, a filling valve between both chambers, a passage for the admission of liquid fuel to said precombustion chamber, a pump for supplying fuel oil, another pump (preferably a lubricating oil pump) controlled by the governor for operating the filling valve, and a control mechanism for the purpose of operating either the first mentioned pump for injecting fuel into the precombustion chamber or the other pump for operating the filling valve or both pumps.

38. In a combustion engine for liquid or pulverized fuels the combination of a working cylinder, a precombustion chamber, a fuel storage chamber, a connection between both chambers, a geared filling valve of the double type which shuts off the said connection and determines the quantity of fuel and additional air to be together fed to said precombustion chamber and which controls the air current carrying the fuel from the storage chamber to said precombustion chamber, and passages for the admission of liquid fuel and compressed air to said precombustion chamber.

39. In a combustion engine for liquid or pulverized fuel the combination of a working cylinder, a precombustion chamber, a fuel storage chamber, a connection between both chambers and a geared filling valve having the form of an ejector, means for supplying an air current which measures the charge taken from the fuel storage chamber and delivers it to said precombustion chamber.

RUDOLF PAWLIKOWSKI.